United States Patent
Joshi et al.

(10) Patent No.: US 10,635,672 B2
(45) Date of Patent: Apr. 28, 2020

(54) METHOD AND SYSTEM FOR MERGING DATA

(71) Applicant: Yahoo Holdings, Inc., Sunnyvale, CA (US)

(72) Inventors: Bhautik Joshi, San Francisco, CA (US); Peter Welch, Belmont, CA (US); Ayan Ray, San Francisco, CA (US)

(73) Assignee: Oath Inc., New York, NY (US)

( * ) Notice: Subject to any disclaimer, the term of this patent is extended or adjusted under 35 U.S.C. 154(b) by 233 days.

(21) Appl. No.: 14/949,932

(22) Filed: Nov. 24, 2015

(65) Prior Publication Data

US 2017/0060937 A1    Mar. 2, 2017

Related U.S. Application Data

(60) Provisional application No. 62/213,554, filed on Sep. 2, 2015.

(51) Int. Cl.
*G06F 16/00* (2019.01)
*G06F 16/2455* (2019.01)

(52) U.S. Cl.
CPC ................ *G06F 16/2455* (2019.01)

(58) Field of Classification Search
CPC ................ G06F 17/30477; G06F 16/2455
USPC ........................................................... 707/736
See application file for complete search history.

(56) References Cited

U.S. PATENT DOCUMENTS

| | | | |
|---|---|---|---|
| 7,110,998 B1 | 9/2006 | Bhandari | |
| 2003/0167231 A1* | 9/2003 | Winking | G06Q 20/04 |
| | | | 705/40 |
| 2005/0216485 A1 | 9/2005 | Bell et al. | |
| 2008/0140609 A1 | 6/2008 | Werner et al. | |
| 2011/0184813 A1* | 7/2011 | Barnes | G06F 16/9535 |
| | | | 705/14.66 |
| 2014/0351233 A1 | 11/2014 | Crupi et al. | |

FOREIGN PATENT DOCUMENTS

| | | | | |
|---|---|---|---|---|
| CN | 101198953 A | | 6/2008 | |
| WO | WO 2006/119652 | * | 5/2005 | ............. G06F 17/30 |
| WO | 2006119652 A1 | | 11/2006 | |
| WO | 2014190209 A1 | | 11/2014 | |

OTHER PUBLICATIONS

Extended European Search Report dated Jan. 25, 2017 in EP Application No. 16186787.4.
(Continued)

*Primary Examiner* — Chelcie L Daye
(74) *Attorney, Agent, or Firm* — Pillsbury Winthrop Shaw Pittman LLP

(57) ABSTRACT

The present teaching relates to methods, systems, and programming for reconciling or merging real time data with bulk data. In one example, a first attribute value is obtained. The first attribute value characterizes an aspect of a data item. A second attribute value related to the first attribute value is obtained. The second attribute value characterizes the aspect of the data item. A scheme is selected to be used to determine a third attribute value to characterize the data item. The third attribute value is determined in accordance with the selected scheme as well as the first and second attribute values.

20 Claims, 10 Drawing Sheets

(56) References Cited

OTHER PUBLICATIONS

Office Action dated Feb. 22, 2018 in European Application 16186787.4.
Office Action dated Nov. 29, 2018 in Chinese Application 201610740613.8.
Office Action dated May 14, 2019 in Chinese Application No. 201610740613.8.
Office Action dated Oct. 14, 2019 in Chinese Patent Application No. 201610740613.8.
Extended European Search Report dated Jan. 2, 2020 in EP Patent Application No. 19188438.6.

* cited by examiner

METHOD AND SYSTEM FOR MERGING DATA

CROSS-REFERENCE TO RELATED APPLICATION

The present application claims priority to U.S. Provisional Patent Application No. 62/213,554, filed Sep. 2, 2015, entitled "METHOD AND SYSTEM FOR MERGING DATA," which is incorporated herein by reference in its entirety.

BACKGROUND

1. Technical Field

The present teaching relates to methods, systems, and programming for data processing. Particularly, the present teaching is directed to methods, systems, and programming for reconciling or merging real time data with bulk data.

2. Discussion of Technical Background

Many applications on the Internet have a backfill data source including large periodically static collections of records. It is difficult to project the data from the backfill data source to a serving system. Accordingly, in addition to the backfill data source, an application may also have a real-time data source that includes an ever-growing collection of master-data records from disparate systems. The data in the real-time data source changes at a high rate. Combining the real-time data with the backfill data, the application may include a total corpus exceeding 20 billion records. A challenge exists to serve this large amount of data in a unified way to tens of millions of users concurrently at low latency, while maintaining a high-degree of correctness and consistency.

From time to time, the data across the full corpus may need to be re-computed. This may require doing a full update of the data whilst continuing to serve new updates live at low latency and high scale. An open source distributed database, e.g. HBase, may facilitate very fast bulk loads, while concurrently taking writes from real time updates to the same HBase infrastructure. However, there is no existing scheme to practically merge these real-time data and bulk data in the backfill.

Therefore, there is a need to develop techniques for effectively merging the real-time data and the bulk data.

SUMMARY

The present teaching relates to methods, systems, and programming for data processing. Particularly, the present teaching is directed to methods, systems, and programming for reconciling or merging real time data with bulk data.

In one example, a method, implemented on a machine having at least one processor, storage, and a communication platform capable of connecting to a network for merging data is disclosed. A first attribute value is obtained. The first attribute value characterizes an aspect of a data item. A second attribute value related to the first attribute value is obtained. The second attribute value characterizes the aspect of the data item. A scheme is selected to be used to determine a third attribute value to characterize the data item. The third attribute value is determined in accordance with the selected scheme as well as the first and second attribute values.

In a different example, a system for merging data is disclosed, which comprises a data value fetcher configured for obtaining a first attribute value and a second attribute value related to the first attribute value, wherein the first attribute value characterizes an aspect of a data item and the second attribute value characterizes the aspect of the data item; a combination scheme selector configured for selecting a scheme to be used to determine a third attribute value to characterize the data item; and a resolved value determined configured for determining the third attribute value in accordance with the selected scheme as well as the first and second attribute values.

Other concepts relate to software for implementing the present teaching on merging data. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for merging real time data with bulk data is disclosed. The information, when read by the machine, causes the machine to perform the following: obtaining a first attribute value, wherein the first attribute value characterizes an aspect of a data item; obtaining a second attribute value related to the first attribute value, wherein the second attribute value characterizes the aspect of the data item; selecting a scheme to be used to determine a third attribute value to characterize the data item; and determining the third attribute value in accordance with the selected scheme as well as the first and second attribute values.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
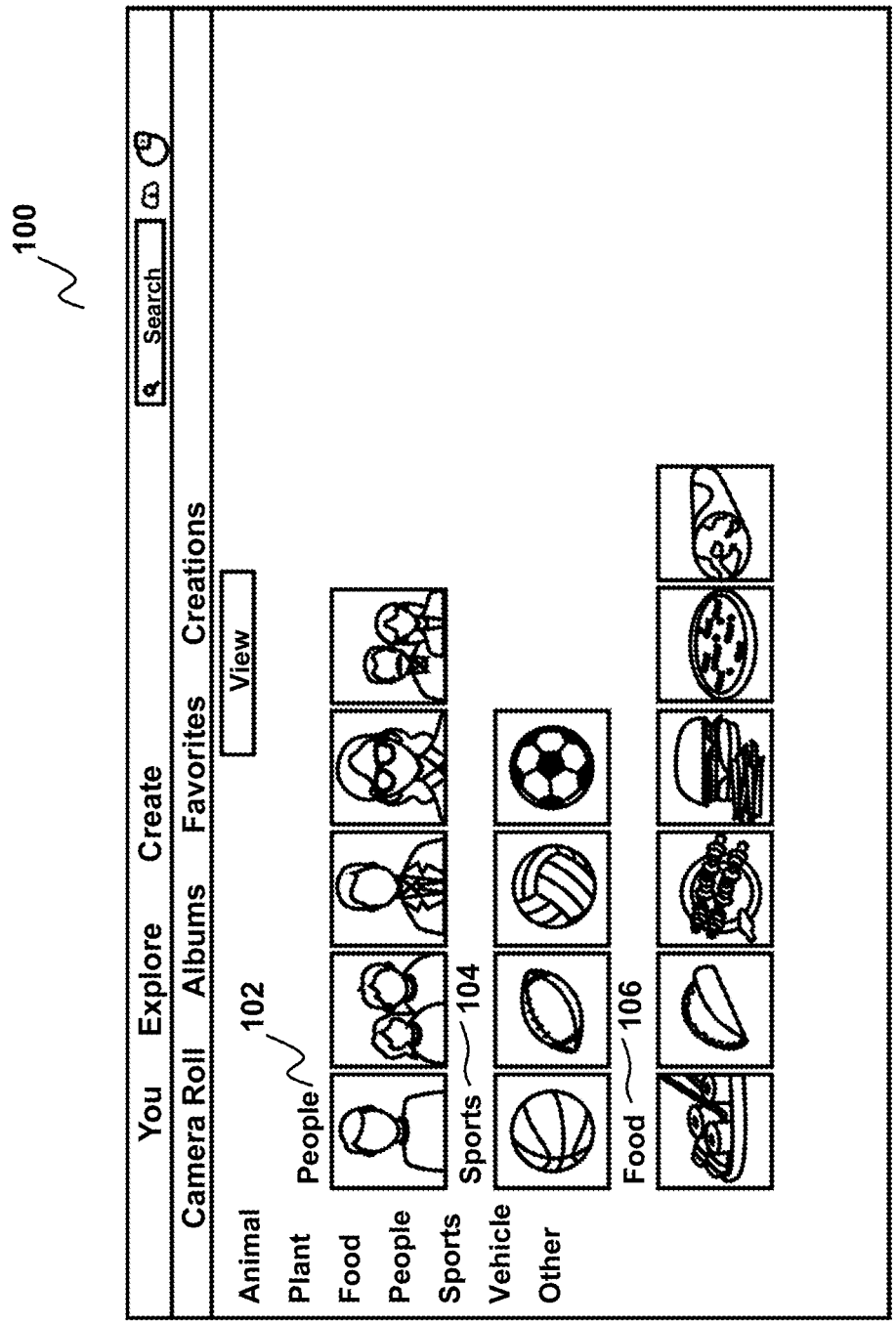
FIG. 1 illustrates a magic view of photos, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure presents a novel architecture for fusing largescale bulk compute with real time streaming compute to power an application, e.g. a photo sharing application like Flickr's Magic View. The Magic View may be designed to be a delightful experience, providing an object and subject based view of a user's own photo stream based on image content alone. To deliver this, the system in the present disclosure can use a single table for both real time and bulk compute, while pushing out the consistency on read. Addressing one of the issues about the complexity of the conventional architecture, named as Lambda architecture, the disclosed system can significantly simplify the implementation but still deliver a responsive, real time databases operating at a scale of 30 billion records, 50 million of which are incrementally added and updated per day.

This system permits very broad and deep serving of data from Lambda Architecture at very low latency. Its design also facilitates both surgical real time and whole-dataset updates while maintaining a high degree of consistency and correctness.

It takes a long turnaround time to project data from large periodically static collections of records (backfills) to a serving system. This problem has been especially acute with large data sets often on the scale of petabytes in size. Map-reduce may be used for quickly creating and storing backfills. But the challenge is how to project these backfills to existing serving stacks (key-value stores, RDBMS, and search engine) in a similarly reasonable timeframe (hours or days, not days or weeks).

In addition to the backfill, an application can have an additional, ever-growing collection of master-data records from disparate systems. The data in the real-time data source changes at a high rate (e.g. ~100 million record updates/day). Combining the real-time data with the backfill data, the application may include a total corpus exceeding 20 billion records. The system in the present teaching may serve this large amount of data in a unified way to tens of millions of users concurrently at low latency, while maintaining a high-degree of correctness and consistency.

Some of the data may be generated by cutting-edge algorithms that are under steady development and improvement. On average there is significant user benefit to re-compute this data across the full corpus every 6-8 weeks. This may require doing a full update of the data whilst continuing to serve new updates live at low latency and high scale.

HBase is an open source distributed database, which has matured as a flexible large-scale key-value data store that can facilitate very fast bulk loads (~400K records per second), while concurrently taking writes from real time updates to the same HBase infrastructure (Region servers, tables, etc.) The problem created then is how to practically merge these "real time" and "backfill" sources of data.

The system in the present teaching can merge these data at real time using a predictive activity queue, where a "cache primer" or "the Warmr" observes and scans HBase to project entities to a low latency serving tier.

The concept of merging real time and backfill data is first described below. There are two categories of data cells: "values" and "trumps". "Values" are attributes on the entity that will be projected into the serving tier (e.g. photo date taken). "Trumps" represent a signal to delete the entity from the cache. All cells are modeled with a "sibling" double-reference between real time and backfill representations. In accordance with one embodiment, the algorithm states: "trumps" always trump values (hence the name) and real time always trumps backfill.

There may be different levels of trumps. In one example, some trumps, like the ones related to check the adultness of a photo or hide a tag, do not mean the photo should be removed immediately from cache based on the presence of it in the result set. In other examples, some trumps are deterministic trumps, e.g. the delete trump, where its existence in a result set immediately determines its removal from cache.

The Warmr aims to minimize HBase scan IO while keeping above-the-fold cold-cache latency low. In order to achieve this, the system snapshots the HBase scan results' max timestamp to the caching tier. This allows the system to scan HBase at high frequency in steady-state only for the latest data changes (i.e. cells whose timestamps are after the snapshot timestamp from the previous scan). This adds complexity to the real time/backfill priority hierarchy/merging algorithm.

In one embodiment, max timestamp can also be generalized into max version ID, where version is a configurable and monotonically increasing value. In order to minimize HBase scan IO while keeping above-the-fold cold-cache latency low, the system snapshots the HBase scan results' max version ID (timestamp) to the caching tier. Therefore, this system works for any database that has monotonically increasing version IDs, or the ability to have them (i.e. the user can add them manually if they didn't exist natively).

In one example, since "trump" cells always take priority over "value" cells, and "real time" cells always trump their "backfill" siblings, the system sometimes needs to run multiple fetches on HBase for the same row. So for example, if the system scans on a time range and only finds backfill data, the system must check back-in-time for any potential real time data. This additional HBase IO can be mitigated by packaging this portion of the "Warmr" as an HBase Co-Processor.

In various embodiments, other than the phrase HBase Co-Processor, any database that can run logic where the data resides is sufficient, e.g. Triggers in MySQL, Postgres, or Cassandra can all be implemented to meet the same idea.

Due to this "real time trumps backfill" algorithm, the real time "lane" can clog new updates that are written to backfill. To solve this, the system can orchestrate a "cleanup" phase in which a carefully selected set of real time data is periodically moved to the backfill cells. This may be done in careful coordination with low-watermark data timestamps of the contributing bulk data sets processed in map-reduce.

An up-front benefit of the system is that it is relatively simple to implement, augment and debug. It is strongly decoupled from the database architecture so it also provides operational simplicity. The database can be updated "live" while the Warmr is working and the Warmr will provide an eventually consistent result; an additional advantage of this is that it permits decoupled backfills at a massive scale. The system may be lightweight in scale. The practical implementation of the system does not require a lot of hardware and memory for serving billions of records into a large in-memory cache.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 illustrates a magic view of photos, according to an embodiment of the present teaching. The Magic View 100 may aggregate and group users' photos taxonomically based on autotags 102, 104, 106, and provide a seamless, "fast to navigate" view; e.g. grouping all of a user's pictures of "cats." For example, Flickr's Magic View takes the hassle out of organizing users' own photos by applying cutting edge, computer vision technology to automatically categorize photos in users' photo stream and present them in a seamless view based on the content in the photos.

Figure 2:
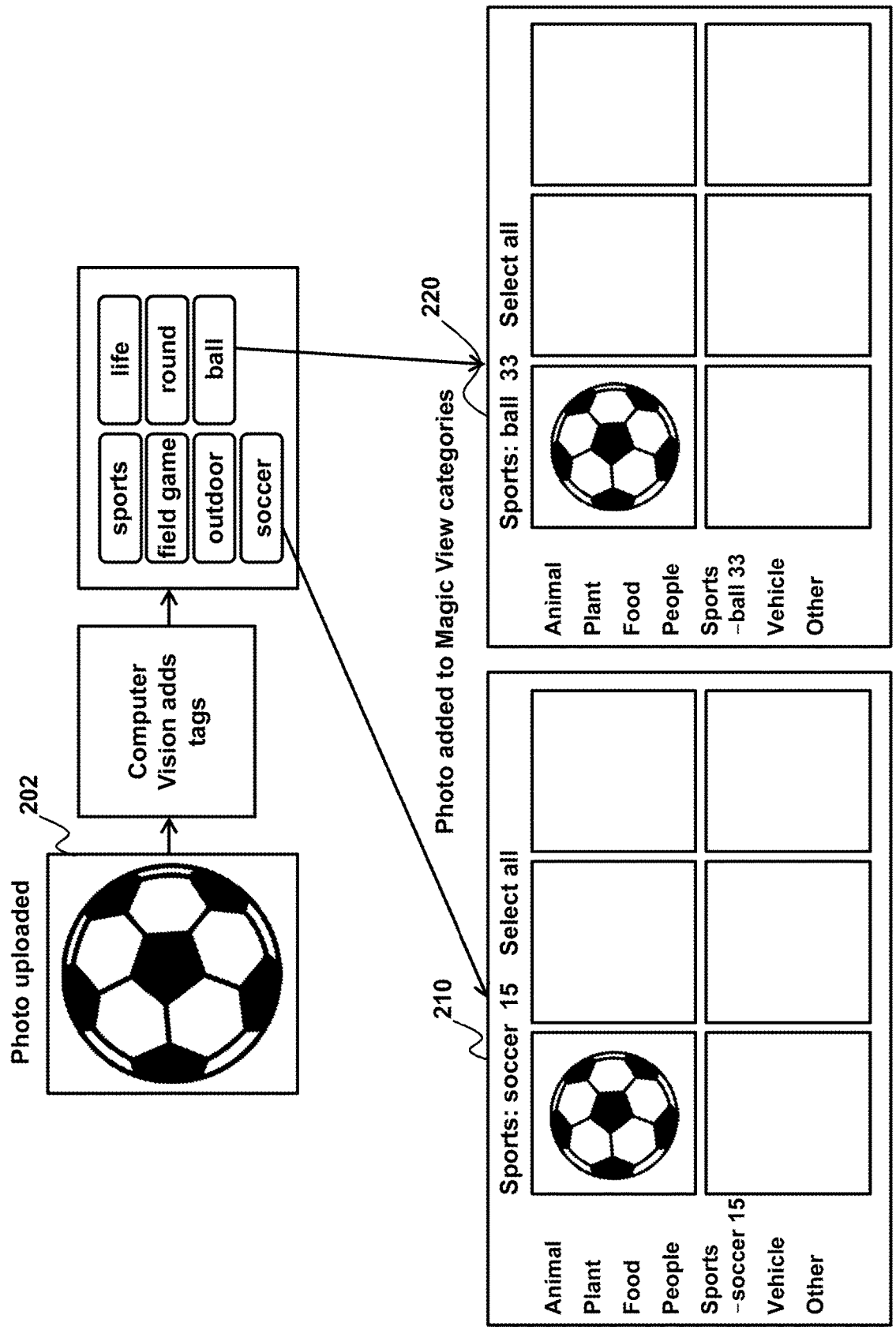
FIG. 2 illustrates adding a photo to a magic view category, according to an embodiment of the present teaching.

This may all happen in real time. As soon as a photo is uploaded, it is categorized and placed into the Magic View. FIG. 2 illustrates adding a photo to a magic view category, according to an embodiment of the present teaching. As shown in FIG. 2, after a photo 202 is uploaded, it can be added to a category of soccer 210 and added to a category of ball 220.

When an image is uploaded, it may be processed by a computer vision pipeline to generate a set of autotags, which are text descriptors of the contents of the image. In addition to stream computing autotags in an upload, the system includes a data store that computes per user aggregations of the photos. In addition, these aggregations are maintained. If a photo was added, removed or updated, the aggregations could be surgically updated to reflect this. The system would be initialized with autotags for all 12 billion photos in the system and run regular backfills for the cases where the stream compute missed images.

The system would create per-user Magic View categories for over 12 billion images on Flickr—as well as update the categories with the tens of millions of tags generated from real time data as it streams in. Ideally, the system can efficiently but separately manage the bulk and real time data that only computes the final state when requested.

Powered by Apache HBase, the system includes a new scheme to fuse results from bulk and real time aggregations. Using a single table in HBase, the system is able to independently update and manage the bulk and real time data in the system while always being able to provide a consistent, correct result.

Pig and Oozie are used to quickly compute and load the results of large-scale, offline bulk computation. These robust tools are great for quick initialization of the system and periodically backfilling any missing data. Storm is used to power the real time pump of data into the system and is mediated by a Java layer that fans out writes to HBase. When a user requests to see their data, a final Java process is responsible for combining the bulk and real time data into its final state.

This solution is a novel improvement on what is sometimes known as Lambda Architecture. The system in the present teaching improves on basic Lambda architecture by simplifying some of its complexity making maintenance and development easier.

A traditional database query is a function that operates on all of the data that it stores to retrieve a result. It can be abstracted as:

result=Query(data)

The core of the Lambda architecture replaces a traditional database with a real time and bulk databases, and changes the framing of the query function to:

result=Combiner(Query(real time data)+Query(bulk data))

Figure 3:
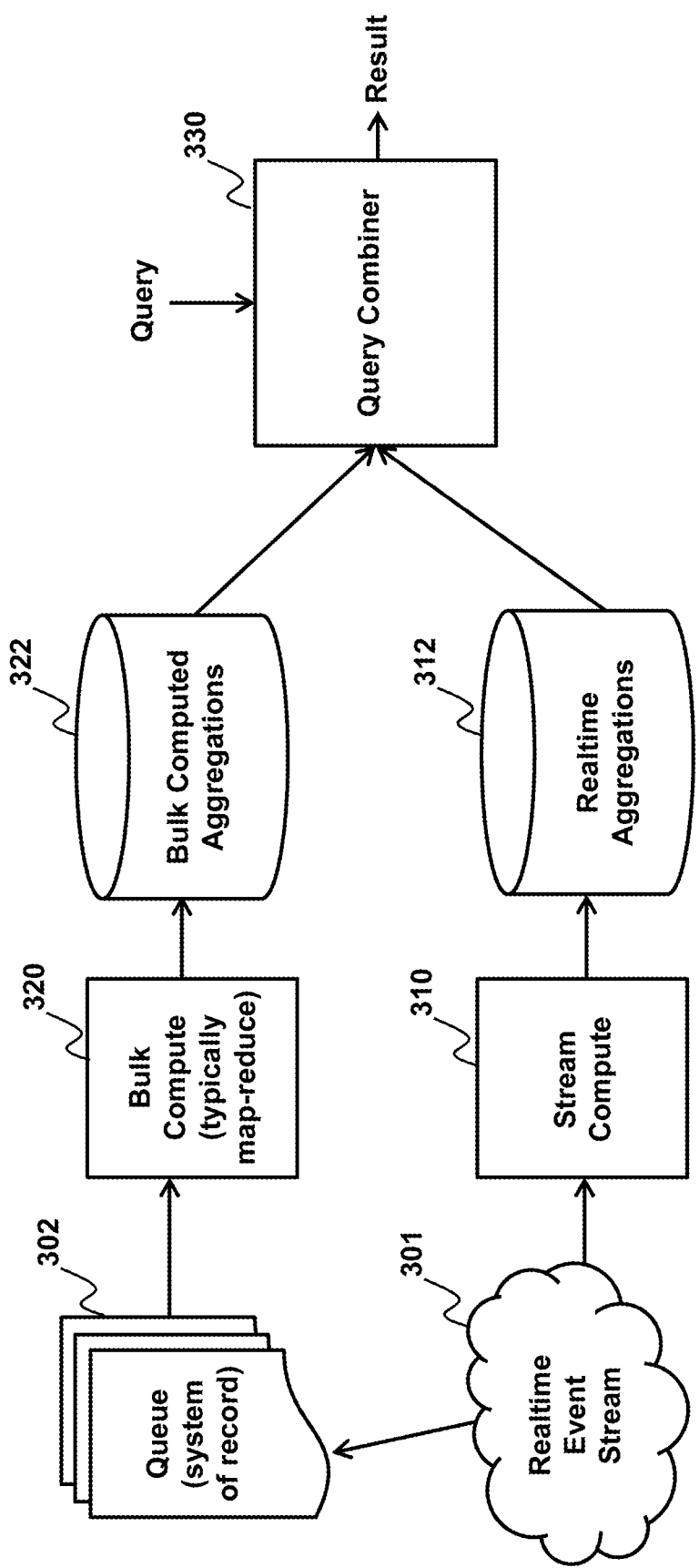
FIG. 3 illustrates a typical Lambda Architecture for processing real time event stream, according to prior art.

FIG. 3 shows an example of a typical Lambda Architecture. It is powered by an "append only" queue 302 for its system of record, which is fed by a real time stream of events 301. Periodically, all the data in the queue 302 is fed into a bulk computation 320 which pre-processes the data to optimize it for queries, and stores these aggregations in a bulk compute database 322. The real time event stream 301 drives a stream computer 310, which processes the incoming events into real time aggregations 312. A query then goes via a query combiner 330, which queries both the bulk and real time databases, computes the combination and stores the result.

Whilst relatively new, Lambda Architecture has enjoyed popularity and a number of concrete implementations have been built. This style of architecture enjoys robustness and fault tolerance via eventual consistency. If a piece of data is skipped in the real time compute there is a guarantee that it will eventually appear in the bulk compute database.

While Lambda architecture seemed like a natural fit for our problem, the system opposed the cost and complexity of having separate databases. Instead, the system implemented a single database system which simplifies the query equation to:

result=Combiner(Query(data))

The system may use HBase (a BigTable style, non-relational database). By backing the system with a single database, this addresses the major concerns of Lambda architecture, significantly simplifying the complexity and code paths. How was this achieved? For a single row of data in HBase, the system has the concept of real time columns and bulk columns. These two sets of columns are managed separately by the real time and bulk subsystems respectively. At query time, the system performs a single fetch and the combiner will assemble the final result from the bulk and real time data.

Our concrete implementation is centered around using HBase as a key to multiple value store. This is initialized by bulk compute in Pig Latin, updated in real time by Storm and correctness is guaranteed by a bulk compute based backfill process. The combiner may be a Java process which uses a novel scheme to minimize or even hide read latency from the user.

Figure 4:
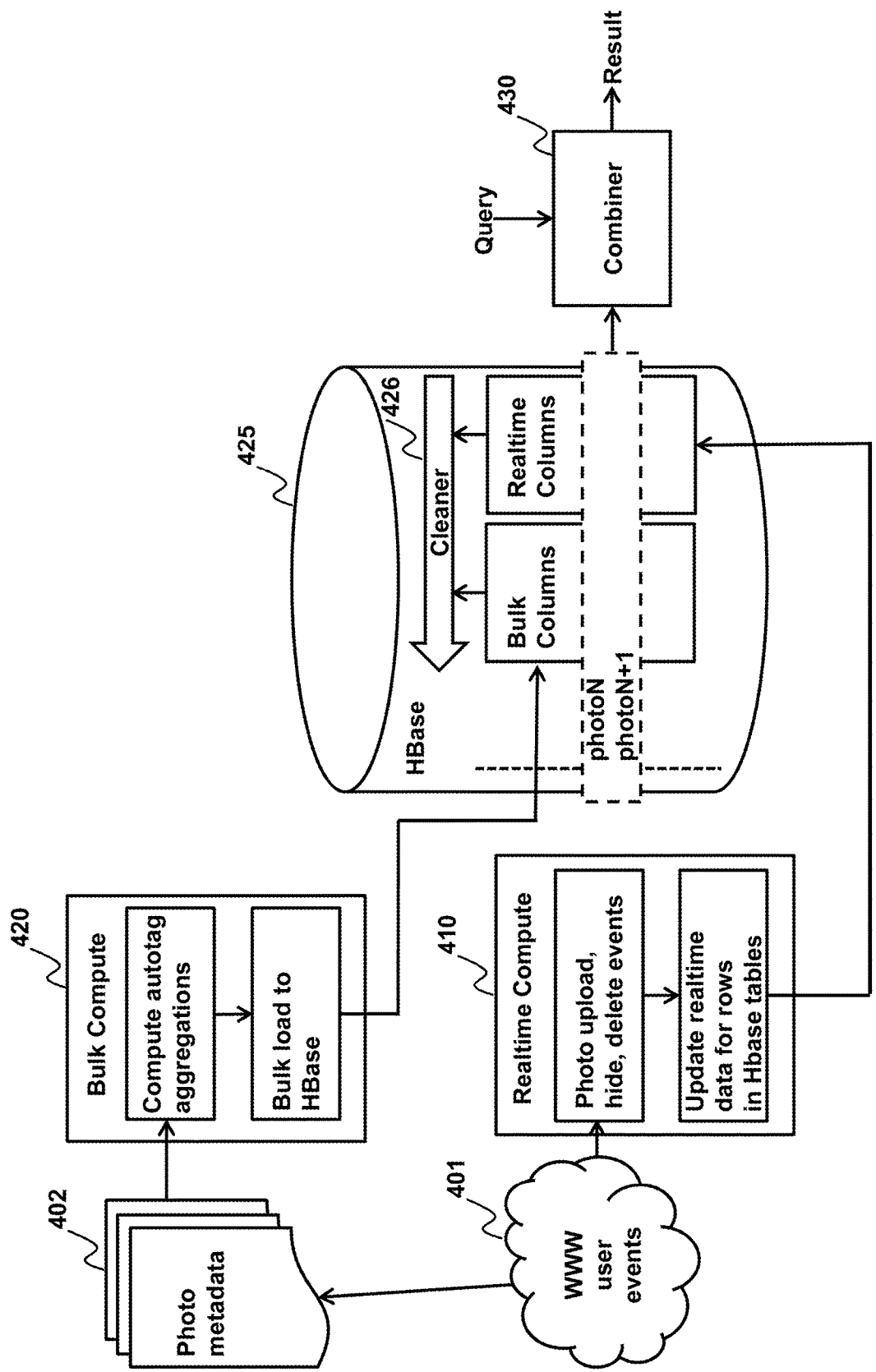
FIG. 4 illustrates an exemplary system architecture for processing real time event stream, according to an embodiment of the present teaching.

FIG. 4 shows an overview of the system and an enhanced Lambda architecture. For the purposes of this discussion, a convenient abstraction is to consider that each row in the HBase table represents the current state of a given photo with metadata 402 that is fed by the Internet user events 401. In general, the metadata 402 may be a persistent queue that is fed by any real time event stream. The system implements the simplified Lambda architecture by giving each row two sets of columns—real time and bulk—which are managed independently by the real time subsystem 410 (e.g. storm) and the bulk compute subsystem 420 (e.g. Pig Latin and Oozie). The combiner 430 stage may be abstracted into a single Java process running on its own hardware—the Warmr—which computes on the data in HBase and sends it to a Redis cache which is used by the serving layer for the site.

When a photo is uploaded, it is processed by our computer vision pipeline to generate a set of autotags, which are text descriptors of the contents of the image. Whilst the system had an existing architecture for stream computing autotags in on upload, Magic View needed a data store that computes per-user aggregations of them. In addition, these aggregations would have to be maintained. If a photo was added, removed or updated the aggregations would have to be surgically updated to reflect this. The system would also need to initialize the system with autotags for all 12 billion photos in the system and run regular backfills for the cases where the stream computes missed images.

HBase in Magic View

Below, the setup and lifecycle of our main table in the system, owner_photo_autotags, are described. In this table, the system have per-row: a rowkey that takes the md5sum of the owner_id and appends a photo_id and the autotag for a given photo—e.g. md5(ownerId)_photoId_autotag; and a set of columns for each rowkey which may or may not be populated—real time-[score, hidden, deleted] and bulk-[score, hidden, deleted]. While the md5sum can help to distribute evenly across the cluster, any uniform distribution algorithm could work similarly to prevent hot-spots.

A typical photo would have one or more autotags. A complete description for a photo would then be a set of rows, whose rowkeys would be, e.g., adjacent to each other in HBase e.g. md5(ownerId)_photoId_ski, md5(ownerId)_photoId_snow, md5(ownerId)_photoId_mountain. Conveniently, HBase provides a scan filter operator that allows us to easily select all of the data for a given photo using a simple regex—e.g. md5(ownerId)_photoId_*. Following that logic, selecting all of the data for a given user can be achieved using a scan filter with an even broader but as-simple regex—e.g. md5(ownerId)_*.

Consistency on Read in HBase—the Warmr

The system has two sets of columns to go with each row in HBase—bulk and real time attributes. For each of these sets, the system maintains a number of attributes. In some embodiments, three attributes can be represented as columns:

score—the computer vision confidence level the system has in this autotag for this photo. The system use this score for sorting. This value will be updated every time the computer vision pipeline is upgraded.

hide—the user has the option to hide the autotag for a given photo. If they have done this, it is set as a flag here and the photo is no longer shown in Magic View for that particular autotag.

delete—if a photo has been deleted, this flag is set. This is important so that if a user has deleted a photo, the system removes it from Magic View as soon as possible. So that this flag can serve for signaling that a removal is needed.

In this embodiment, the combiner 430—which the system may refer to as the Warmr—combines the data all six of these columns. For example, to determine the final value for each attribute: in the case where data exists for real time but not for bulk (or vice versa) then there is only one value to choose; in the case where they both exist the system always choose the real time value.

After determining the resolved value or final value, the system may not store the resolved values in a persistent store, but can transform each resolved value to either an "add" or "delete" on the serving cache. Moreover, the system may take the max timestamp from the cells returned in the scan so during the subsequent scan only new data will be returned. This keeps the persistent state easy to manage and minimizes the state machine complexity to keep the bulk and real-time systems simple.

In another embodiment, the system stores the resolved values in a persistent store, e.g. in an additional column set in the table described above.

Regularly running backfill jobs will periodically sweep over collections of rows (usually correlated by time) in HBase. The job moves data from the real time columns to the bulk columns since the data has 'settled', making the job of picking what is the correct data to read much simpler.

Stream Compute—Incremental Updates

For Magic View, the system has three sets of streaming events that drive the system: Photo uploads, which generate a new photoId and a set of autotags that go with it; Autotag hides, which is a signal to remove a photo from a Magic View aggregation for a given autotag; Photo deletes, which is a signal to remove a photo from all Magic View aggregations; Photo replaces, which replaces one set of autotags for a given photo with a new set. These events are fed into a set of Storm spouts, which in turn send these events to our Data Access Object.

The Data Access Object (DAO)

The Data Access Object is Java class that the system built to interface and manage the data in the real time columns for a given photo or autotag object. It maps the high level events—photo uploads, deletes and replaces, autotag hides—to a minimal set of HBase get and put operations. In the DAO, the system also 'enrich' the autotags as the set of autotags for a given image changes. This is to support the taxonomical tree in the Magic View, and as an example it typically involves adding an enriched 'sport' tag if the 'ski', 'snow' and 'mountain' autotags are present.

In an ideal world, these high level operations would map to atomic transactions. In practice, however, the system found that because the system was getting and putting data across multiple tables the locking led to terrible performance, and in practice the system hadn't seen any practical need for transactions.

Bulk Compute

System Initialization

The system considered first initializing the tables in HBase by replaying the complete history of the event streams through the DAO. While this was producing correct results, it took a very long time. For loading 10 years worth of data, the system had projected a load time of 28 days. This was mainly due to, as mentioned in the transaction discussion, needing to read and write to multiple tables for each event.

The system instead tried precomputing the data for each table and loading the data directly, and that had a load time of 7 hours. The system realized that the system could avoid having bulk and real time collide by separating out the bulk and real time data into separate columns and this led to the central innovation of this paper.

Backfill

At Flickr the system has a number of static copies of SQL tables that are dumped to the grid on a daily or weekly basis. The system refers to this collection of metadata as Flickr All Raw, or FLAR. The system has also built a system for copying a small version of every single image the system has on Flickr to the grid and storing them in sequence files; our PhotosPixels data source. The system is able to combine data from both these sources—FLAR and PhotosPixels—in an offline, exhaustive computer vision driven pipeline to completely describe (up to a given point in time) all the data and aggregations that live in Magic View.

The Combiner and Cleaner

By selecting timestamps in FLAR and joining against PhotosPixels, the system can choose to compute the data for Magic View for all time or for a shorter time period. This time period can be used to generate smaller sets of data for backfill jobs; by tuning this time period (e.g. running it daily) the system can execute fast running loads that put a reasonable upper bound on how long it takes for a photo to turn in up Magic View in case the real time processing misses it. When reading a single row of data from HBase, the system needs to combine the data from the real time and the bulk columns. If only the bulk or real time data exists, then selecting the data is obvious. If both bulk and real time data exists, the system always picks real time. This seems reasonable, but causes a subtle problem.

For example, photo computer vision tags are added via real time compute, i.e., there is no bulk data. Later on, the system re-computes all available photos using a new version of the computer vision tagging, and loads this data (including this photo) via a bulk load. Even though the newer data exists in the bulk column, the system can't get to it because the combiner 430 will only read the real time column, according to one combination scheme. The system solves this by running the Cleaner process 426 on all the data in HBase after the system does a bulk load.

The Cleaner simply visits each row and sees if the HBase timestamp for the real time data is older than the bulk load. If it is, then the system deletes the real time data for that row since it's already captured in the bulk columns. This way the results of the bulk compute aren't 'published' until the cleaner has run.

Results

Production Throughput

At scale, our architecture has been able to keep up comfortably with production load.

For initialization of the system from bulk compute, the system is able to run a throttled load (11 mappers) of autotag information for 12 billion photos (translates to ~23 billion autotag rows) in 25 hours via map-reduce. The system can simultaneously run backfills to HBase and serve user information at the same time without impacting latency within cache SLA's.

Our HBase instances that drive Magic View are configured with 3 tables across 23 region servers and 1200 regions. On the read side, our DAO is comfortably facilitating 2150 HBase reads per second (includes Storm reads) and 400,000 writes per second. Our combiner—the Warmr—drives a large part of the reads; the Warmr itself drives 1250 reads per second for loading user data into the serving cache.

Figure 10:
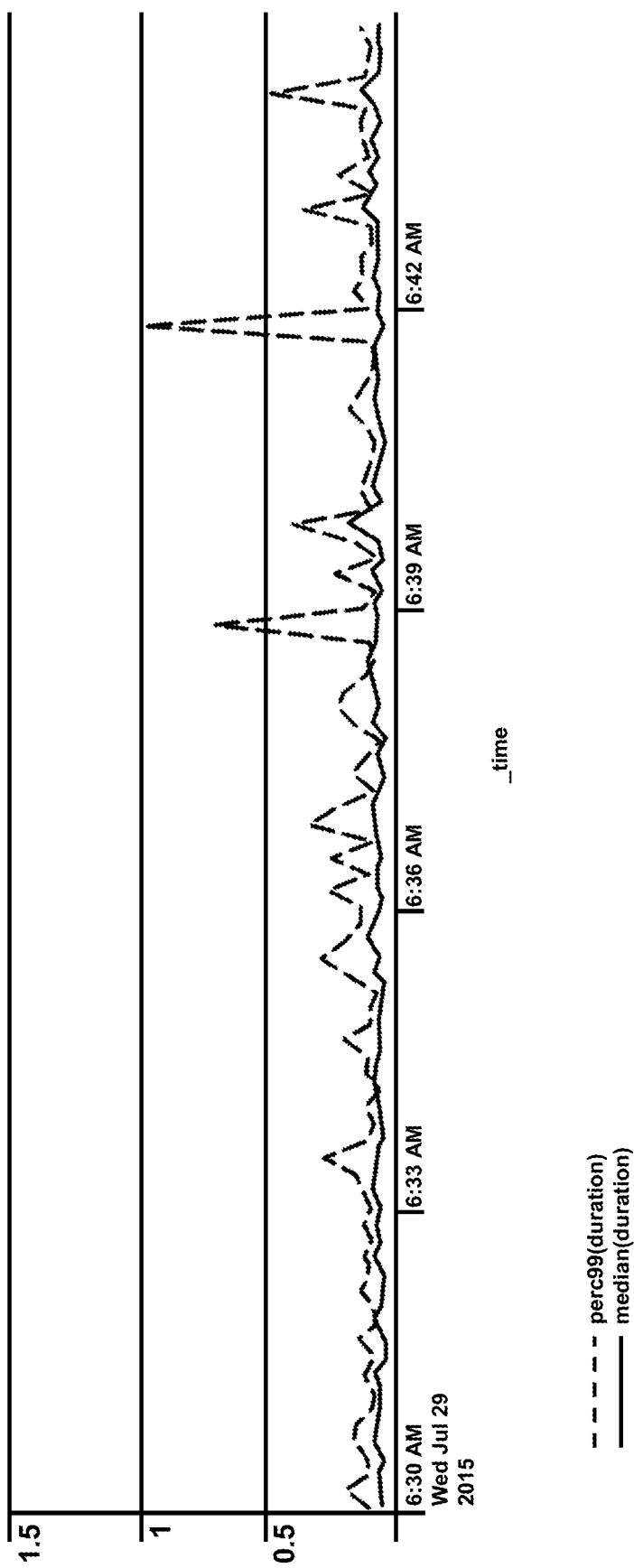
FIG. 10 illustrates user experience of the system, according to an embodiment of the present teaching.

The most important measure for how the system works is how the user perceives it. The slowest part of the system is paging data from HBase into the serving cache. As shown in FIG. 10, the median time for the user to perceive that it is 'done' is around 10 ms. For the 99th percentile this may spike up to half or even one second; this is largely made up of 'whale' users with unusually large (tens or hundreds of thousands) collections of photos.

In this disclosure, we've presented a novel simplification of Lambda architecture for fusing bulk and real time compute. By taking the real time and bulk tables and combining them horizontally in HBase, the system were able to significantly simplify and consolidate the query architecture, reducing the number of moving pieces and minimizing the number of points for failure. Moreover the system is able to demonstrate this system in practice and at scale, where the system is able to deliver queries on the data well within product expectations.

The present teaching described above may be realized in accordance with various embodiments. First, although the above disclosure describes three types of exemplary values that are subject to resolution, other values, e.g., features values that characterize the objects or regions of an image, may also be subject to the disclosed invention scheme disclosed. For example, color blobs identified in an image may have a real time and bulk values. Similarly, texture features of each such color blob may also characterize the image and have real time and bulk values. Such real time and bulk feature values may be stored in the same configuration as disclosed in each row in corresponding real time and bulk columns. Depending on the nature of the values, the algorithms used to combine may differ.

The combiner may combine or reconcile the real time value and the bulk value associated with an attribute based on a scheme which may be selectable dynamically according to different on-the-fly conditions. Below, a general scheme for determining a final or resolved value for the attribute based on real time and bulk data is described. The problem itself can be formulated as follows:

$$\text{Resolved Value} = f(S_R, S_B);$$

where $S_R$ denotes a set of values from real time data; $S_B$ denotes a set of values from bulk data; and $f(\ )$ denotes a function with parameters $S_R$ and $S_B$. With this formulation, a resolved value for attribute K can be achieved based on the real time value of attribute K, or $S_R^K$, and the bulk value of attribute K, or $S_B^K$. Different embodiments of computing a resolved value of attribute K are formulated below.

In one embodiment, the system may use the following scheme to determine a final or resolved value for each attribute: in case where data exists for real time but not for bulk (or vice versa), the system chooses the one available value as the resolved value; in the case where both real time and bulk values exist, the system chooses the real time value as the resolved value. This scheme may be described with the following general formulation:

$$\text{Resolved Value for Attribute } K = $$
$$f(S_R^K, S_B^K) = \begin{cases} S_R^K; & \text{if } S_R^K \text{ exists;} \\ S_B^K; & \text{if } S_R^K \text{ does not exist.} \end{cases}$$

It can be understood that in accordance with another embodiment, when both real time and bulk values exist, the system may choose either of the real time and bulk values as the resolved value. The selection of the resolved value in this situation may be pre-determined (e.g., simply select the real time value) or depend on other conditions, e.g., the specific type of the attribute to be resolved. For instance, for an attribute that is associated with accuracy, the system may select the bulk value to trump the real time value if both values exist but are not consistent in value.

In a different embodiment, when both the real time value and the bulk value are numerical, the system may also determine a resolved value based on a computation that uses both the real time and bulk values. For example, a weighted sum of the real time value and the bulk value may be used to compute the resolved value. This scheme may be described with the following equations:

$$\text{Resolved Value for Attribute } K = f(S_R^K, S_B^K) = aS_R^K + bS_B^K.$$

It can be understood that the coefficients a and b may be chosen based on application needs, the nature of the features, or based on a machine learning.

According to another embodiment, the values that are used to determine a resolved value of an attribute may not be the corresponding values in its own real time and bulk versions. For instance, the system may assign $S_R^J$ or $S_B^J$ as the resolved value, when both $S_R^K$ and $S_B^K$ do not exist, where $S_R^J$ is an approximate version of $S_R^K$; $S_B^J$ is an approximate version of $S_B^K$. For example, attribute K represents a color of a region in a photo, while attribute J represents a grey scale of the same region of the photo. Thus, $S_R^J/S_B^J$ may be a coarse version of $S_R^K/S_B^K$.

In other embodiments, features of a photo or a region thereof may be hierarchical. For example, a blob in a photo may have multiple features, including texture, hue, color, brightness, etc. In this case, the blob (which may be represented as a boundary) is a feature that is higher in the hierarchy than features associated with the blob. When such organization exists, in certain situations, a feature value at a higher level may be used for computing a resolved value of a lower level feature. Formally, this may be described as follows.

Resolved Value for Attribute $K =$ $$f(S_R, S_B) = \begin{cases} S_R^K, & \text{if } S_R^K \text{ exists;} \\ S_B^K, & \text{if } S_B^K \text{ exists \& } S_R^K \text{ not exist;} \\ S_B^J, & \text{if } S_B^K, S_R^K \text{ not exist \& } S_B^J \supset S_B^K. \end{cases}$$

or:

Resolved Value for Attribute $K =$ $$f(S_R, S_B) = \begin{cases} S_R^K, & \text{if } S_R^K \text{ exists;} \\ S_B^K, & \text{if } S_B^K \text{ exists \& } S_R^K \text{ not exist;} \\ S_R^J, & \text{if } S_B^K, S_R^K \text{ not exist \& } S_R^J \supset S_R^K. \end{cases}$$

where "$S_B^J \supset S_B^K$" means feature J is a higher level feature than feature K in a feature hierarchy. The above formulation provides different possibilities as to how to resolve when a higher level feature value is to be used to determine a resolved value of a lower level feature. It can be understood that in accordance with some embodiment, the system may have an algorithm to determine whether to use $S_R^J$, $S_B^J$, or a function combining the two values to be the resolved value.

In another embodiment, real time and bulk values corresponding to multiple features may be used to compute a resolved value of a particular feature. For example, the resolved value of feature A may be computed based on real time and bulk values of a plurality of features, which may or may not include feature A.

In some embodiment, the system may also compute a resolved value based on a time series data. For example, the system may store values derived previously at different time instances, e.g., $S_R^K(t-1)$, $S_R^K(t-2)$, ... $S_R^K(t-M)$. At time t, in order to compute a resolved value, the system may elect to use $S_R^K$ at time t, if it exists, or rely on the time series $S_R^K(t-1)$, $S_R^K(t-2)$, ... $S_R^K(t-M)$ to derive the resolved value. In this scenario, the system may predict $S_R^K(t)$ (or $S_B^K(t)$) based on the time series data:

$$S_R^K(t) = h[S_R^K(t-1), \ldots S_R^K(t-M)];$$

$$S_B^K(t) = g[S_B^K(t-1), \ldots S_B^K(t-N)];$$

assuming that the system stores $S_R^K$ at M previous instances and $S_B^K$ at N previous instances. Here h and g represent two functions of predicting current value based on time series data. For example, the prediction functions may be based on a linear extrapolation function. In above formulation, the prediction based on a time series is performed based on a single time series.

In some embodiment, when predicting a resolved value, the prediction may be performed based on the time series data corresponding to both real time and bulk values over time. In this case, the system may predict the resolved value based on both $S_R^K(t)$ and $S_B^K(t)$ that are equal in value, wherein $S_R^K(t)$ is predicted based on the time series of the real time values and $S_B^K(t)$ is predicted based on time series of the bulk values. That $S_R^K(t)$ and $S_B^K(t)$ being equal means that the two predictions via extrapolation intersect.

Other implementations of the combining the real time and bulk data to derive a resolved value are also possible and are all within the scope of the present teaching.

Figure 5:
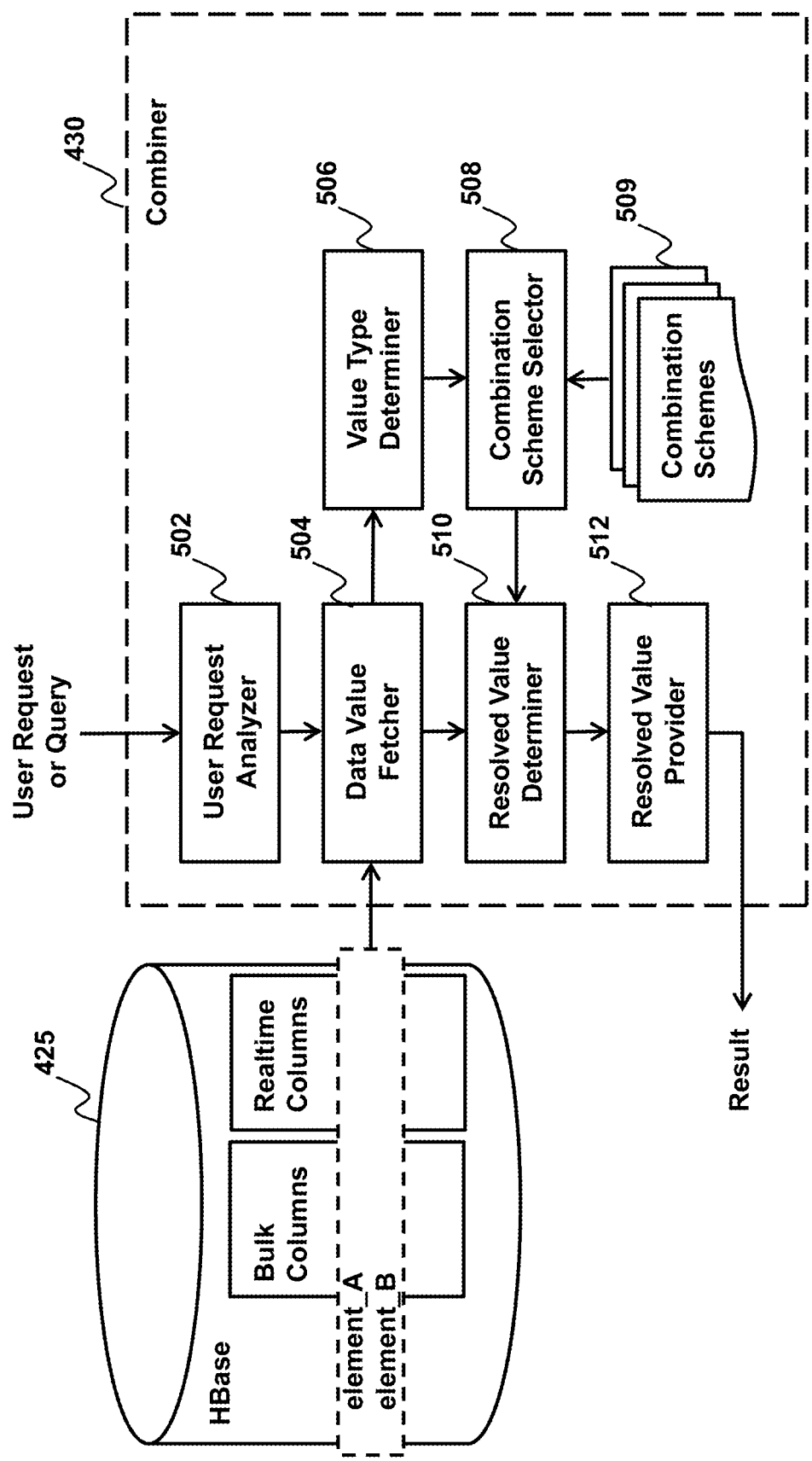
FIG. 5 illustrates an exemplary diagram of a combiner in the system architecture for processing real time event stream, according to an embodiment of the present teaching.

FIG. 5 illustrates an exemplary diagram of a combiner 430 in the system architecture for processing real time event streams, according to an embodiment of the present teaching. In this example, the 430 includes a user request analyzer 502, a data value fetcher 504, a value type determiner 506, a combination scheme selector 508, one or more combination schemes 509, a resolved value determiner 510, and a resolved value provider 512.

The 502 in this example may receive and analyze a request from a user. The request may be for stream data related to the user and stored in a database, e.g. the HBase 425. For example, the request may be for photo stream of a user of Magic View. The 502 may send the analyzed request to the 504 for fetching data.

The 504 in this example may fetch stream data items from the database, based on the analyzed request. As discussed above, each data item may have an attribute that corresponds to two values: a bulk value and a real-time value. Based on the fetched data, the 504 may obtain the two values for each aspect of each data item.

To resolve or reconcile the two values, the 506 may determine a value type for each attribute value. In one embodiment, the value types may be utilized to select a combination scheme for merging the two values.

The 508 in this example can select one of the combination schemes 509, to resolve the two values. As discussed above, the combiner 430 may combine or reconcile the real time value and the bulk value associated with an attribute based on a combination scheme which may be selectable dynamically according to different on-the-fly conditions. The 508 may send the selected combination scheme to the 510.

The 510 in this example can determine a resolved value in accordance with the selected combination scheme, for each aspect of each data item. For example, a user has the option to hide the autotag for a given photo, based on a setup of an attribute "hide." If the bulk value and the real time value for the attribute "hide" are different, the 510 may determine a final resolved value for the attribute "hide" of the given photo, based on the selected combination scheme. The combination scheme may determine which of the two values should be used as the final resolved value. In another example, a given photo may have a computer vision confidence level in the autotag that describes the content of the given photo, based on a setup of an attribute "score" or "cv confidence." If the bulk value and the real time value for the attribute "score" are different, the 510 may determine a final resolved value for the attribute "score" of the given photo, based on the selected combination scheme. The combination scheme may determine to compute a weighted average score based on the two values to be the final resolved value.

The 512 in this example may provide the data items each with the resolved values to the user, as a result of the user's request.

Figure 6:
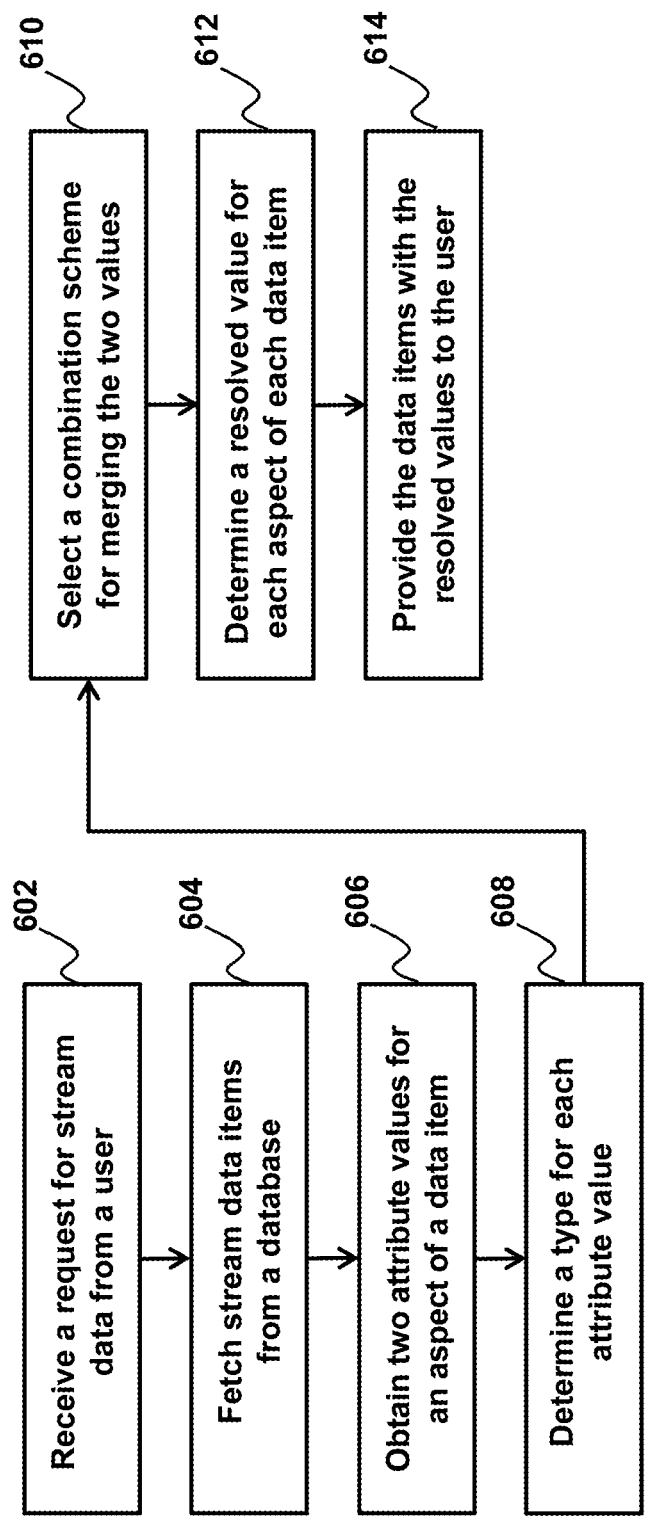
FIG. 6 illustrates an exemplary process performed by a combiner in the system architecture for processing real time event stream, according to an embodiment of the present teaching.

FIG. 6 illustrates an exemplary process performed by a combiner in the system architecture for processing real time event stream, e.g. the combiner 430 in FIG. 5, according to an embodiment of the present teaching. A request for stream data is received from a user at 602. Stream data items are fetched from a database at 604. Two attribute values are obtained at 606 for an aspect of a data item.

At 608, a type is determined for each attribute value. A combination scheme is selected at 610 for merging the two values. At 612, a resolved value is determined for each aspect of each data item. At 614, the data items are provided with the resolved values to the user.

Due to this "real time trumps backfill" algorithm, the real time "lane" can clog new updates that are written to backfill. To solve this, the system can orchestrate a "cleanup" phase in which a carefully selected set of real time data is periodically moved to the backfill cells, as shown in the HBase 425 in FIG. 4. This may be done in careful coordination with low-watermark data timestamps of the contributing bulk data sets processed in map-reduce. In practice, the real time system is more error prone than the bulk system so that running this process at a daily or weekly cadence can correct data that may have been missed during real time processing.

Figure 7:
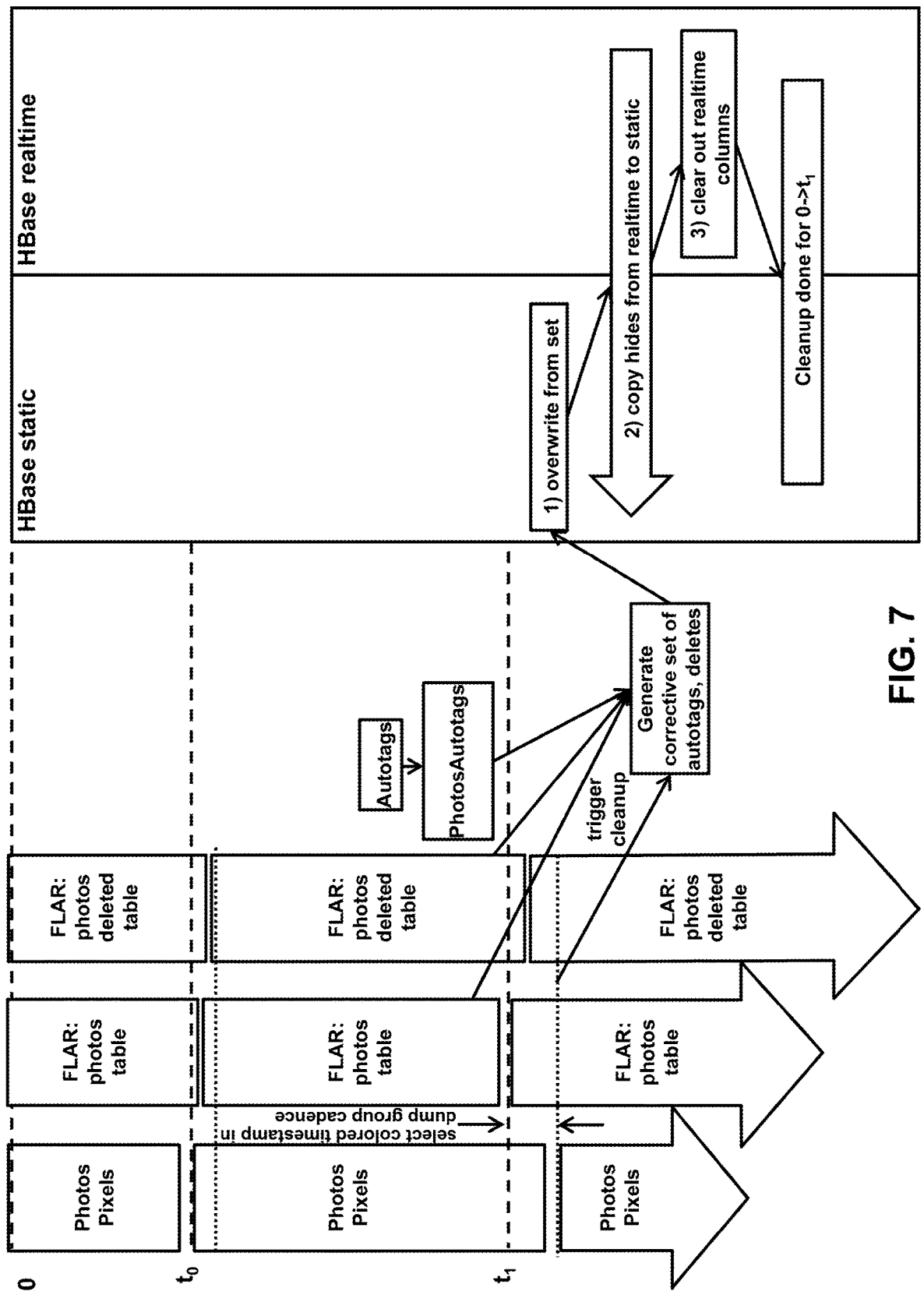
FIG. 7 illustrates a timing flow of a cleanup function of the system, according to an embodiment of the present teaching.

The backfill cleanup examines the canonical on-disk datasets to identify the maximum time period which the system knows to be correct—i.e. not still being written to by real time or data processing streams. This block of the canonical dataset contains data that is potentially missing from the real time data stream (this periodically happens) so the system loads this to the bulk component of the database. For that same identified time period in the database, the system then identifies any real time updates that may "trump" the just-loaded canonical bulk data and "publish" this data to the bulk columns and wipe out the now-stale data in the real time columns. A timing diagram is shown in FIG. 7.

Figure 8:
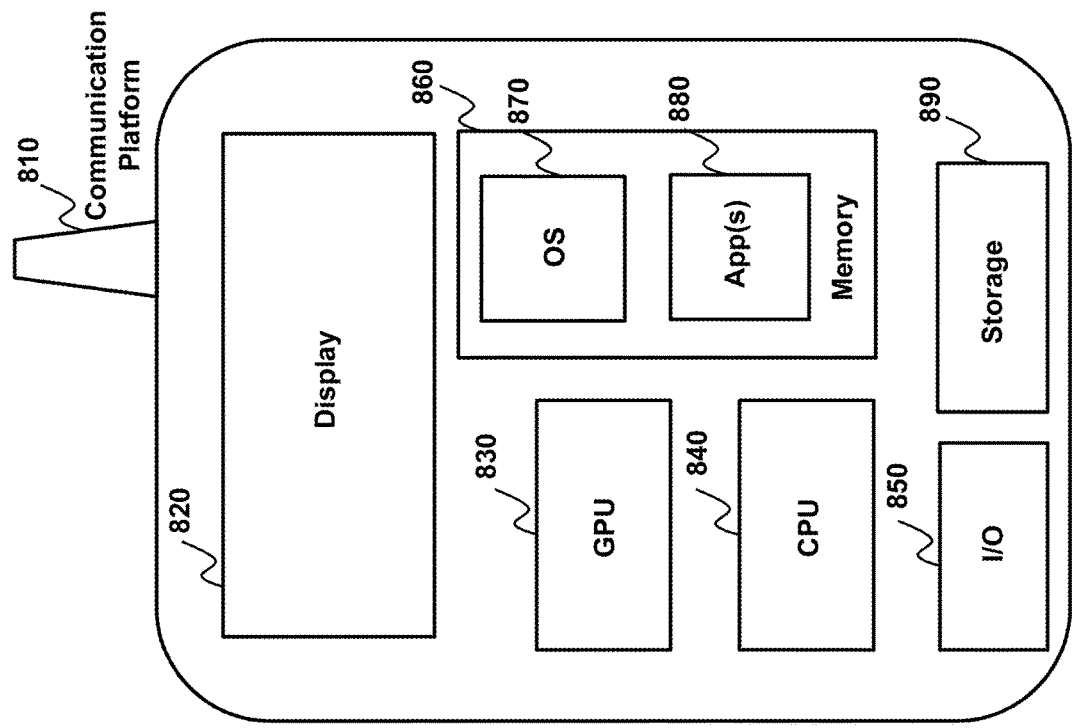
FIG. 8 depicts the architecture of a mobile device which can be used to implement a specialized system incorporating the present teaching.

FIG. 8 depicts the architecture of a mobile device which can be used to realize a specialized system implementing the present teaching. In this example, the user device on which a query is sent to the system is a mobile device 800, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 800 in this example includes one or more central processing units (CPUs) 840, one or more graphic processing units (GPUs) 830, a display 820, a memory 860, a communication platform 810, such as a wireless communication module, storage 890, and one or more input/output (I/O) devices 850. Any other suitable component, including but not limited to a system bus or a controller (not shown), may also be included in the mobile device 800. As shown in FIG. 8, a mobile operating system 870, e.g., iOS, Android, Windows Phone, etc., and one or more applications 880 may be loaded into the memory 860 from the storage 890 in order to be executed by the CPU 840. The applications 880 may include a browser or any other suitable mobile apps for receiving query result on the mobile device 800. User interactions with the query result or other content items may be achieved via the I/O devices 850 and provided to the system.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to merging data as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 9:
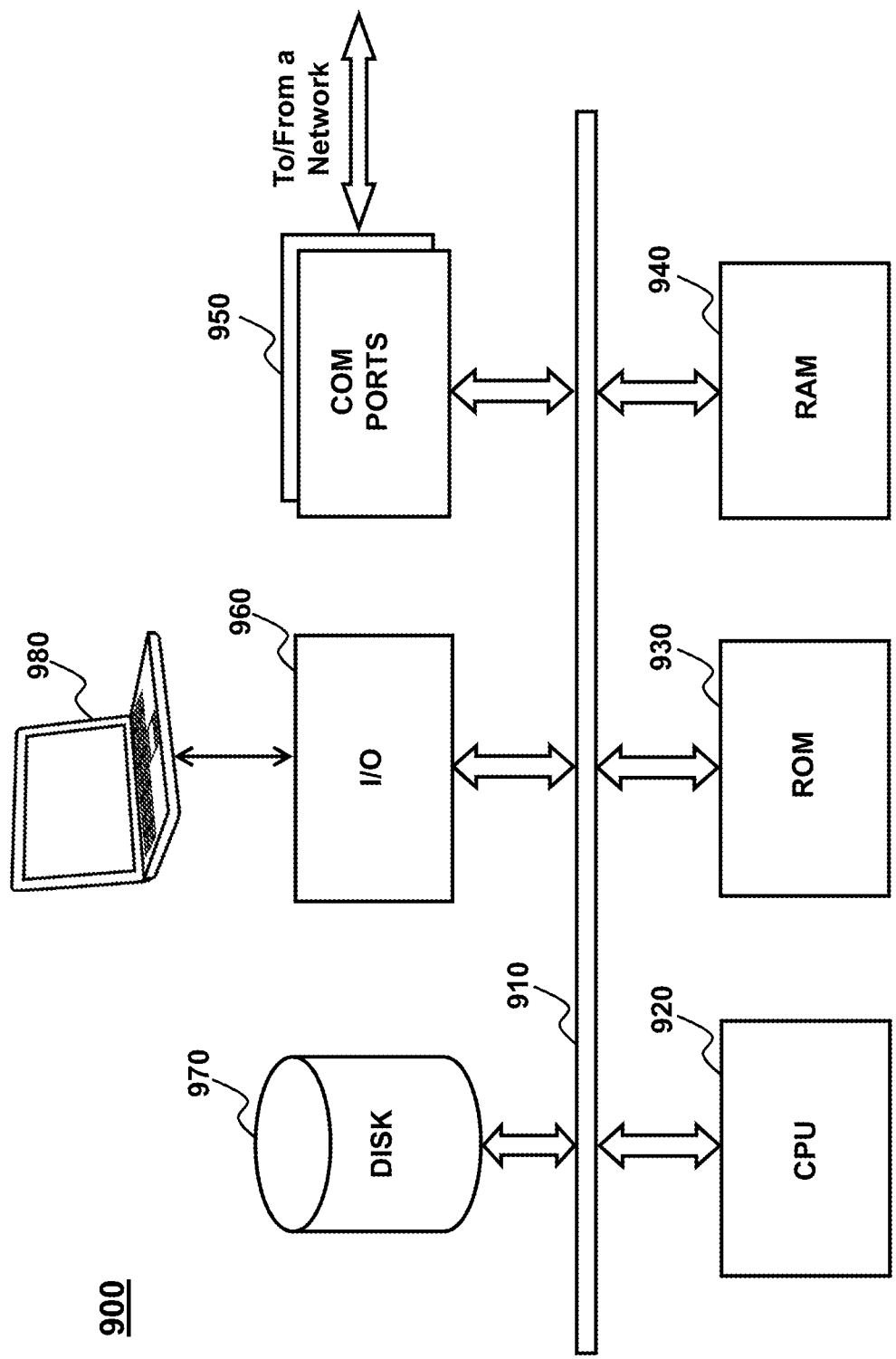
FIG. 9 depicts the architecture of a computer which can be used to implement a specialized system incorporating the present teaching.

FIG. 9 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 900 may be used to implement any component of the merging data techniques, as described herein. For example, the system as shown in FIG. 4 may be implemented on a computer such as computer 900, via its hardware, software program, firmware, or a combination thereof. Although only one such computer is shown, for convenience, the computer functions relating to data merging as described herein may be implemented in a distributed fashion on a number of similar platforms, to distribute the processing load.

The computer 900, for example, includes COM ports 950 connected to and from a network connected thereto to facilitate data communications. The computer 900 also includes a central processing unit (CPU) 920, in the form of one or more processors, for executing program instructions. The exemplary computer platform includes an internal communication bus 910, program storage and data storage of different forms, e.g., disk 970, read only memory (ROM) 930, or random access memory (RAM) 940, for various data files to be processed and/or communicated by the computer, as well as possibly program instructions to be executed by the CPU. The computer 900 also includes an I/O component 960, supporting input/output flows between the computer and other components therein such as user interface elements 980. The computer 900 may also receive programming and data via network communications.

Hence, aspects of the methods of data merging, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with data merging. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the data merging as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The present teaching relates to methods, systems, and programming for data processing. Particularly, the present teaching is directed to methods, systems, and programming for reconciling or merging real time data with batch data. In one example, a method, implemented on a machine having at least one processor, storage, and a communication platform capable of connecting to a network for merging data is disclosed. A first attribute value is obtained. The first attribute value characterizes an aspect of a data item. A second attribute value related to the first attribute value is obtained. The second attribute value characterizes the aspect of the data item. A scheme is selected to be used to determine a third attribute value to characterize the data item. The third attribute value is determined in accordance with the selected scheme as well as the first and second attribute values.

The system claim:

1. A method, implemented on a machine having at least one processor, storage, and a communication platform connected to a network for merging data, the method comprising:

receiving a request for a data item;

determining whether the data item resides in at least one of a first data source or a second data source;

obtaining, from the first data source if the data item resides in the first data source, a grey scale version of a first attribute value based on the request, wherein the first attribute value characterizes an aspect of the data item;

obtaining, from the second data source if the data item resides in the second data source, a grey scale version of a second attribute value related to the first attribute value based on the request, wherein the second attribute value characterizes the aspect of the data item;

selecting a scheme to be used to determine a third attribute value to characterize the data item based on an existence of the grey scale version of the first attribute value and the grey scale version of the second attribute value, and where the data item resides; and determining the third attribute value in accordance with the scheme based on a ratio of the grey scale version of the first attribute value to the grey scale version of the second attribute value, wherein the third attribute value is to be provided as a response to the request.

2. The method of claim 1, wherein:

the first data source comprises a real time data source that processes information in real time; and the second data source comprises a backfill data source that processes information in a batch mode.

3. The method of claim 1, wherein selecting the scheme comprises:

determining a first type of the grey scale version of the first attribute value; and selecting the scheme based on the first type.

4. The method of claim 1, wherein selecting the scheme comprises:
  determining a second type of the grey scale version of the second attribute value; and
  selecting the scheme based on the second type.

5. The method of claim 1, further comprising:
  determining a fourth attribute value based on a function of the grey scale version of the first attribute value and the grey scale version of the second attribute value.

6. A system having at least one processor, storage, and a communication platform connected to a network for merging data, the system comprising:
  a user request analyzer configured for:
    receiving a request for a data item, and
    determining whether the data item resides in at least one of a first data source and a second data source;
  a data value fetcher configured for obtaining a grey scale version of a first attribute value and a grey scale version of a second attribute value related to the first attribute value based on the request, wherein the first attribute value characterizes an aspect of the data item and the second attribute value characterizes the aspect of the data item, and wherein the grey scale version of the first attribute value is obtained from the first data source if the data item resides in the first data source and the grey scale version of the second attribute value is obtained if the data item resides in the second data source;
  a combination scheme selector configured for selecting a scheme to be used to determine a third attribute value to characterize the data item based on an existence of the grey scale version of the first attribute value and the grey scale version of the second attribute value, and where the data item resides; and
  a resolved value determiner configured for determining the third attribute value in accordance with the scheme based on a ratio of the grey scale version of the first attribute value to the grey scale version of the second attribute value, wherein the third attribute value is to be provided as a response to the request.

7. The system of claim 6, wherein:
  the first data source comprises a real time data source that processes information in real time; and
  the second data source comprises a backfill data source that processes information in a batch mode.

8. The system of claim 6, further comprising:
  a value type determiner configured for determining a first type of the grey scale version of the first attribute value, wherein the scheme is selected based on the first type.

9. The system of claim 6, further comprising:
  a value type determiner configured for determining a second type of the grey scale version of the second attribute value, wherein the scheme is selected based on the second type.

10. The system of claim 6, wherein the resolved value determiner is further configured for:
  determining a fourth attribute value based on a function of the grey scale version of the first attribute value and the grey scale version of the second attribute value.

11. A machine-readable, non-transitory and tangible medium having information recorded thereon for merging data, the information, when read by the machine, causes the machine to perform the following:
  receiving a request for a data item;
  determining whether the data item resides in at least one of a first data source and a second data source;
  obtaining, from the first data source if the data item resides in the first data source, a grey scale version of a first attribute value based on the request, wherein the first attribute value characterizes an aspect of the data item;
  obtaining, from the second data source if the data item resides in the second data source, a grey scale version of a second attribute value related to the first attribute value based on the request, wherein the second attribute value characterizes the aspect of the data item;
  selecting a scheme to be used to determine a third attribute value to characterize the data item based on an existence of the grey scale version of the first attribute value and the grey scale version of the second attribute value, and where the data item resides; and
  determining the third attribute value in accordance with the selected scheme based on a ratio of the grey scale version of the first attribute value to the grey scale version of the second attribute value, wherein the third attribute value is to be provided as a response to the request.

12. The medium of claim 11, wherein:
  the first data source comprises a real time data source that processes information in real time; and
  the second data source comprises a backfill data source that processes information in a batch mode.

13. The medium of claim 11, wherein selecting the scheme comprises the information, when read by the machine, causing the machine to perform the following:
  determining a first type of the grey scale version of the first attribute value; and
  selecting the scheme based on the first type.

14. The medium of claim 11, wherein selecting the scheme comprises the information, when read by the machine, causing the machine to perform the following:
  determining a second type of the grey scale version of the second attribute value; and
  selecting the scheme based on the second type.

15. The medium of claim 11, wherein the information, when read by the machine, further causes the machine to perform the following:
  determining a fourth attributed value based on a function of the grey scale version of the first attribute value and the grey scale version of the second attribute value.

16. The method of claim 1, wherein selecting the scheme further comprises:
  selecting the scheme to be used based on a type of attribute to be determined for the third attribute value.

17. The method of claim 1, wherein a first timestamp is associated with the first attribute value, a second timestamp is associated with the second attribute value, and the third attribute value is further determined based on the first timestamp and the second timestamp.

18. The method of claim 1, wherein:
  the grey scale version of the first attribute value comprises an approximation of the first attribute value;
  the grey scale version of the second attribute value comprises an approximation of the second attribute value;
  the scheme is selected based on (i) the existence of the approximation of the first attribute value and the approximation of the second attribute value and (ii) the absence of the first attribute value and the second attribute value; and
  the third attribute value is determined based on the ratio of the approximation of the first attribute value to the approximation of the second attribute value.

19. The method of claim 1, wherein:
the first attribute value corresponds to a color of a region of a photo stored in a real time data source;
the second attribute value corresponds to a color of the region of the photo in a backfill data source; and
the ratio comprises a coarse version of a ratio of the color of the region of the photo stored in the real time data source to the color of the region of the photo stored in the backfill data source.

20. The method of claim 1, wherein the grey scale version of the first attribute value and the grey scale version of the second attribute value are obtained in response to determining that the first attribute value and the second attribute value are unavailable for use in determining the third attribute value.

* * * * *